(12) United States Patent
Pokrass et al.

(10) Patent No.: US 10,473,773 B2
(45) Date of Patent: Nov. 12, 2019

(54) TIME SYNCHRONIZATION OF SPATIALLY SEPARATED RADARS

(71) Applicant: GM Global Technology Operations LLC, Detroit, MI (US)

(72) Inventors: Alexander Pokrass, Bat Yam (IL); Igal Bilik, Rehovot (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 415 days.

(21) Appl. No.: 15/334,843

(22) Filed: Oct. 26, 2016

(65) Prior Publication Data

US 2018/0113206 A1    Apr. 26, 2018

(51) Int. Cl.
| | |
|---|---|
| *G01S 13/00* | (2006.01) |
| *G01S 7/02* | (2006.01) |
| *G01S 13/34* | (2006.01) |
| *G01S 13/87* | (2006.01) |
| *G01S 13/93* | (2006.01) |

(52) U.S. Cl.
CPC ............ *G01S 13/003* (2013.01); *G01S 7/023* (2013.01); *G01S 13/343* (2013.01); *G01S 13/878* (2013.01); *G01S 13/931* (2013.01)

(58) Field of Classification Search
CPC .... G01S 13/003; G01S 13/931; G01S 13/878; G01S 7/023; G01S 13/343
USPC ......................................................... 342/59
See application file for complete search history.

(56) References Cited

U.S. PATENT DOCUMENTS

| | | | |
|---|---|---|---|
| 8,704,703 B2 * | 4/2014 | Sanyal | G01S 13/003 342/125 |
| 2004/0165576 A1 | 8/2004 | Reunamaki | |
| 2016/0025844 A1 * | 1/2016 | Mckitterick | G01S 7/35 342/21 |

FOREIGN PATENT DOCUMENTS

| | | |
|---|---|---|
| CN | 102998656 A | 3/2013 |
| CN | 103777178 A | 5/2014 |

\* cited by examiner

*Primary Examiner* — Frank J McGue
(74) *Attorney, Agent, or Firm* — Cantor Colburn LLP

(57) ABSTRACT

A system and method synchronize two radars by transmitting a linear frequency modulated first signal from a first radar, receiving a first reflection at the first radar based on the first signal, transmitting a linear frequency modulated second signal from a second radar, and receiving a second reflection at the second radar based on the second signal. A fast Fourier transform is performed on the first reflection and on the second reflection to obtain a first frequency-domain signal and a second frequency-domain signal. The first frequency-domain signal and the second frequency-domain signal are converted to the time domain to obtain a first time-domain signal and a second time-domain signal. The first time-domain signal and the second time-domain signal are processed to obtain a time difference in transmission of the first signal and the second signal, and the two radars are adjusted based on the time difference to synchronize subsequent transmissions.

11 Claims, 3 Drawing Sheets

TIME SYNCHRONIZATION OF SPATIALLY SEPARATED RADARS

INTRODUCTION

The subject invention relates to time synchronization of spatially separated radars.

A radar system provides target detection and tracking capability in a number of applications. In some applications, more than one radar may be operated jointly. Such joint operation facilitates more accurate target tracking. The two or more radars are generally spatially separated. One radar can hand off the tracking of a target to another or trigger detection of a target by the other, for example. In an exemplary automobile application, a distributed multi-input multi-output (MIMO) radar system can include multiple transmit and receive elements that are spatially distributed at different parts of the automobile. This type of arrangement increases angular resolution and improves signal-to-noise ratio (SNR). However, the joint operation of two or more radars is inefficient if the radars are not synchronized. Accordingly, it is desirable to provide time synchronization of spatially separated radars.

SUMMARY

In one exemplary embodiment of the invention, a method of synchronizing two radars includes transmitting a linear frequency modulated first signal from a first radar among the two radars; receiving a first reflection at the first radar based on the first signal, wherein the first reflection is from a target; transmitting a linear frequency modulated second signal from a second radar among the two radars; receiving a second reflection at the second radar based on the second signal, wherein the second reflection is from the target; performing a fast Fourier transform (FFT) on the first reflection and on the second reflection to respectively obtain a first frequency-domain signal and a second frequency-domain signal; converting the first frequency-domain signal and the second frequency-domain signal to the time domain to respectively obtain a first time-domain signal and a second time-domain signal; processing the first time-domain signal and the second time-domain signal to obtain a time difference in transmission of the first signal and the second signal; and adjusting the two radars, based on the time difference, to synchronize subsequent transmissions by the two radars.

In another exemplary embodiment, a system to synchronize two radars includes a first radar among the two radars configured to transmit a linear frequency modulated first signal and receive a first reflection from a target based on the first signal; a second radar among the two radars configured to transmit a linear frequency modulated second signal and receive a second reflection from a target based on the second signal; a first controller configured to perform a fast Fourier transform (FFT) on the first reflection to obtain a first frequency-domain signal and convert the first frequency-domain signal to a first time-domain signal; and a second controller configured to perform an FFT on the second reflection to obtain a second frequency-domain signal and convert the second frequency-domain signal to a second time-domain signal, wherein the first controller or the second controller processes the first time-domain signal and the second time-domain signal to obtain a time difference and adjusts the two radars based on the time difference to synchronize subsequent transmissions by the two radars.

The above features and advantages and other features and advantages are readily apparent from the following detailed description when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DETAILED DESCRIPTION

Figure 1:
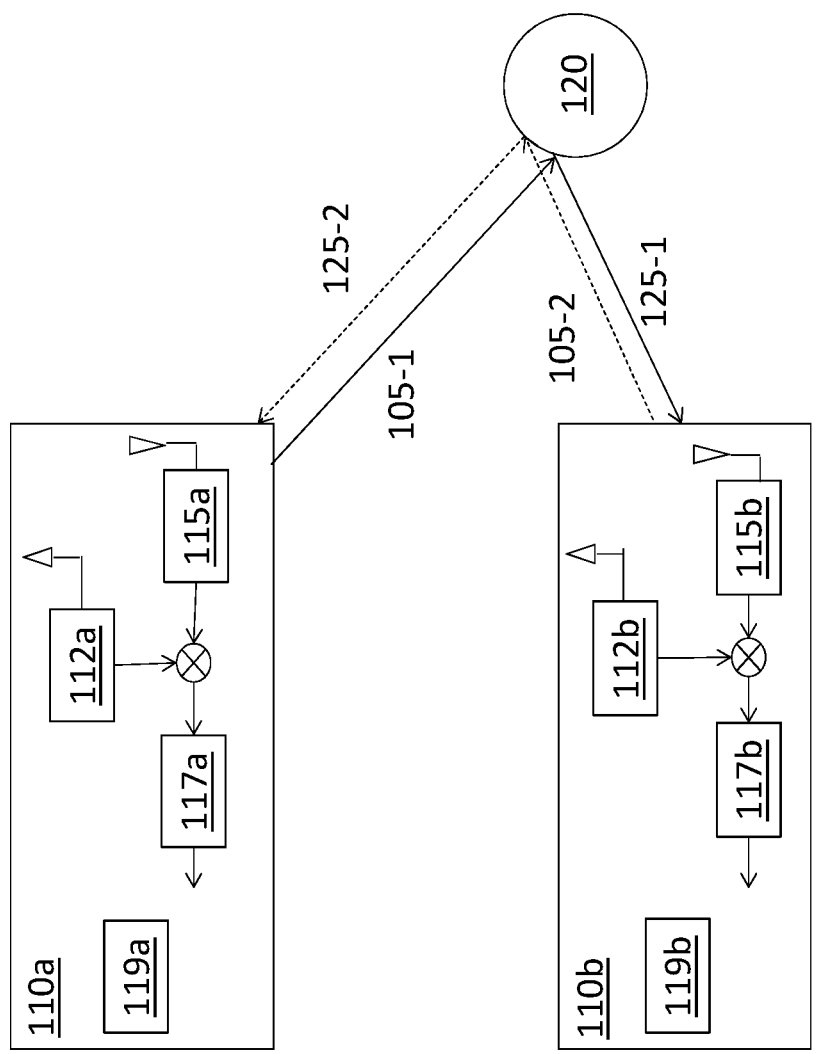
FIG. 1 is a block diagram of an exemplary scenario for synchronizing two radars according to one or more embodiments.

The following description is merely exemplary in nature and is not intended to limit the present disclosure, its application or uses. It should be understood that throughout the drawings, corresponding reference numerals indicate like or corresponding parts and features.

As previously noted, two or more radars can be operated jointly. An exemplary application of multiple radars is in autonomous vehicles and advanced safety features. Two or more radars mounted on the same vehicle or on different vehicles in the same vicinity can be used jointly when they are time synchronized. Each radar transmits a linear frequency modulated signal (i.e., chirp), for example. A 1 nanosecond error in synchronization of chirp transmission by two radars results in a 30 centimeter error in range estimation. In a given radar, accuracy of the range determination is less than 4 centimeters. Thus, synchronization accuracy must be within 100 picoseconds.

A prior approach to synchronizing the radars involves synchronizing the chirp start time of each radar by synchronizing the clocks associated with each of the different radars. However, clock synchronization is less accurate than range measurements obtained by the radars. This is because a more accurate range estimation is possible through interpolation. Embodiments of the systems and methods detailed herein relate to synchronizing the radars based on the fact that range measurements can be more accurate than clock-synchronization. By determining the two frequencies received at the same time based on the two radars, the time within the corresponding pulse duration of each radar can be determined and used to estimate the time offset of one radar transmission from the other.

In accordance with an exemplary embodiment of the invention, FIG. 1 is a block diagram of an exemplary scenario with two radars 110a and 110b (generally, 110). The radar 110a includes a transmit portion 112a, a receive portion 115a, a low pass filter (LPF) 117a, and a controller 119a, and the radar 110b includes a transmit portion 112b, a receive portion 115b, an LPF 117b, and a controller 119b. Each transmit portion 112a, 112b (generally 112) can share an antenna with the respective receive portion 115a, 115b (generally 115) in a transceiver configuration according to an alternate embodiment to the one shown. The controllers 119a, 119b (generally, 119) may be shared by the radars 110a, 110b and may perform functions such as generation of the transmit signal (e.g., chirp 105) and processing of the received signal in addition to other functions of the platform on which the radars 110 are mounted. As previously noted, the radars 110a, 110b can be mounted on different platforms and can communicate wirelessly to operate jointly. The one or more controllers 119 can include an application specific integrated circuit (ASIC), an electronic circuit, a processor (shared, dedicated, or group) and memory that executes one or more software or firmware programs, a combinational logic circuit, and/or other suitable components that provide the described functionality.

The radar 110a transmits a chirp 105-1 that generates a reflection 125-1 that is received by radar 110b, and the radar 110b transmits a chirp 105-2 that generates a reflection 125-2 that is received by radar 110a. The reflections 125-1, 125-2 (generally, 125) are both generated by the same target 120. Thus, the total length of the path traversed by the chirp 105-1 and resulting reflection 125-1 is the same as the length of the path traversed by the chirp 105-2 and resulting reflection 125-2. This fact is used to synchronize radars 110a and 110b.

Figure 2:
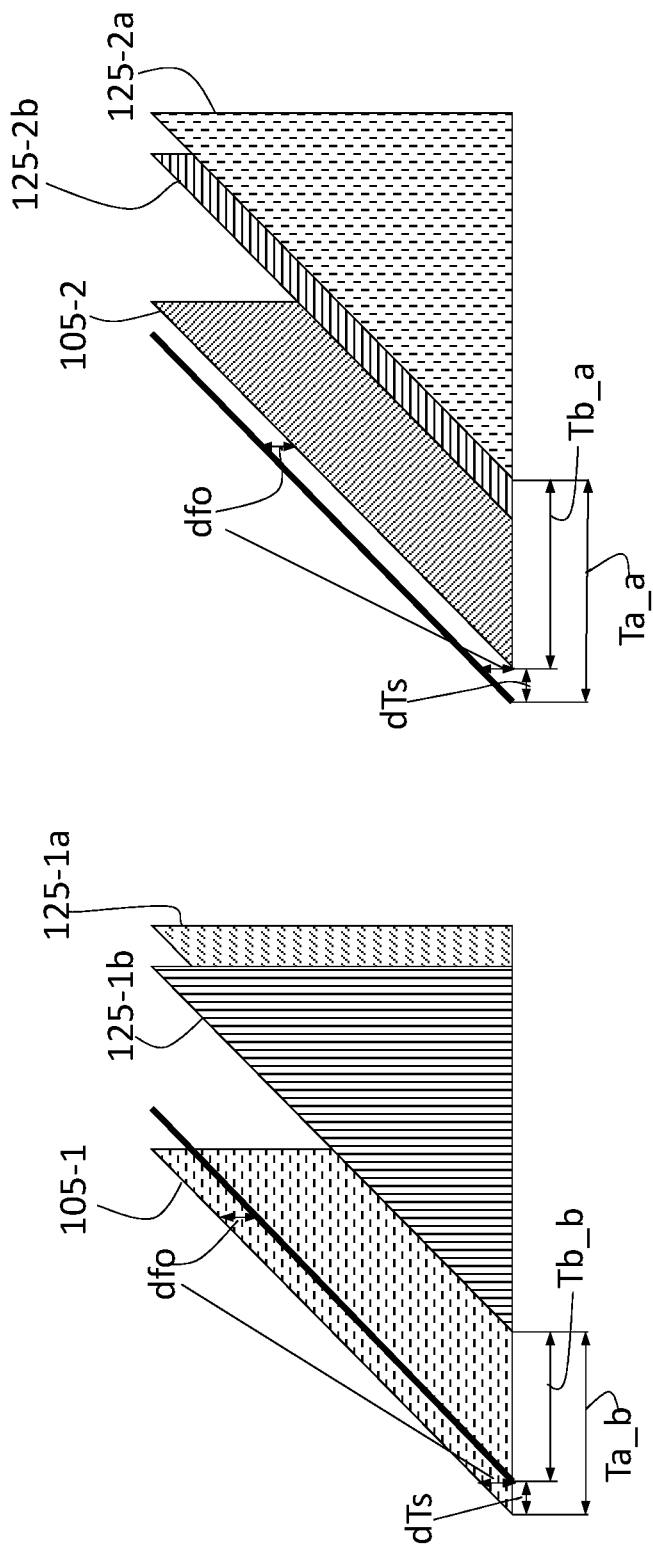
FIG. 2 details the transmitted and received signals associated with each radar shown in FIG. 1 according to one or more embodiments.

FIG. 2 details the transmitted and received signals associated with each radar 110a, 110b shown in FIG. 1 according to one or more embodiments. The exemplary chirps 105-1, 105-2 shown in FIG. 2 have the same frequency slope and represent a simplified case for explanatory purposes. However, as long as the frequency slope is known, the chirp 105 transmitted by each radar 110 need not have the same frequency slope. The chirp 105-1 transmitted by radar 110a results in a reflection 125-1a received by the receiver portion 115a of the radar 110a and also a reflection 125-1b received by the receiver portion 115b of the radar 110b. Because the target 120 is closer to radar 110b in the exemplary arrangement shown in FIG. 1, the reflection 125-1b is received by the radar 110b before the reflection 125-1a is received by the radar 110a based on the same transmitted chirp 105-1, as shown in FIG. 2. The time between transmission of the chirp 105-1 and reception of the reflection 125-1a is indicated as Ta_a and the time between transmission of the chirp 105-1 and reception of the reflection 125-1b is indicated as Ta_b, in FIG. 2. The delay between transmission of the chirp 105-1 and the chirp 105-2 is indicated as dTs. As FIG. 2 indicates, the delay of dTs corresponds with a frequency difference dfo.

The chirp 105-2 transmitted by the radar 110b results in a reflection 125-2b received by the receiver portion 115b of the radar 110b and also a reflection 125-2a received by the receiver portion 115a of the radar 110a. Again, because of the relative distance to the target 120 from each radar 110, the reflection 125-2b is received by the radar 110b before the reflection 125-2a, resulting from the same chirp 105-2, is received by the radar 110a, as indicated in FIG. 2. The time between transmission of the chirp 105-2 and reception of the reflection 125-2b is indicated as Tb_b and the time between transmission of the chirp 105-2 and reception of the reflection 125-2a is indicated as Tb_a, in FIG. 2. Again, the delay between transmission of the chirp 105-1 and the chirp 105-2 is indicated as dTs and corresponds with a frequency difference dfo.

As discussed with reference to FIG. 1, the time Ta_b between transmission of the chirp 105-1 and reception of the reflection 125-1b has to be the same as the time Tb_a between transmission of the chirp 105-2 and reception of the reflection 125-2a. As FIG. 2 indicates, $$Ta\_b = dTs + Tb\_b \qquad [EQ. 1]$$

$$Tb\_a = Ta\_a - dTs \qquad [EQ. 2]$$

Thus, because Ta_b must equal Tb_a, dTs can be determined by equating EQ. 1 and EQ. 2 as follows:

$$dTs = \frac{Ta\_a - Tb\_b}{2} \qquad [EQ. 3]$$

As EQ. 3 indicates, Tb_b can be adjusted such that dTs=0 once Ta_a and Tb_b are determined based on the initial transmissions of chirps 105-1 and 105-2. However, determining Ta_a and Tb_b accurately presents the same challenge of synchronization that is sought to be addressed. Thus, range rather than time is used according to one or more embodiments, as detailed below.

As previously noted, a chirp signal is a linear frequency modulation signal such that the frequency increases at a specified slope during transmission. The chirp 105-1 is transmitted by radar 110a with an initial frequency f1_0 that increases at a specified slope, and the chirp 105-2 is transmitted by radar 110b with an initial frequency f2_0 that increases at the same specified slope according to the exemplary embodiment. As noted previously, the slopes need not be the same but must be known. As FIG. 2 indicates, after a delay of time dTs following transmission of the chirp 105-1 by the radar 110a, the chirp 105-2 is transmitted by radar 110b. Thus, the frequency of chirp 105-1 at the time when the chirp 105-2 is transmitted with the initial frequency f2_0 is f1_dTs. The difference between the frequencies is indicated in FIG. 2 as dfo. Thus, $$f2\_0 - f1\_dTs = dfo \qquad [EQ. 4]$$

Based on EQ. 4, a fast Fourier transform (FFT) of the received reflections 125 is obtained and the result is converted from the frequency to the time domain to determine dTs from range measurements, as detailed below.

Figure 3:
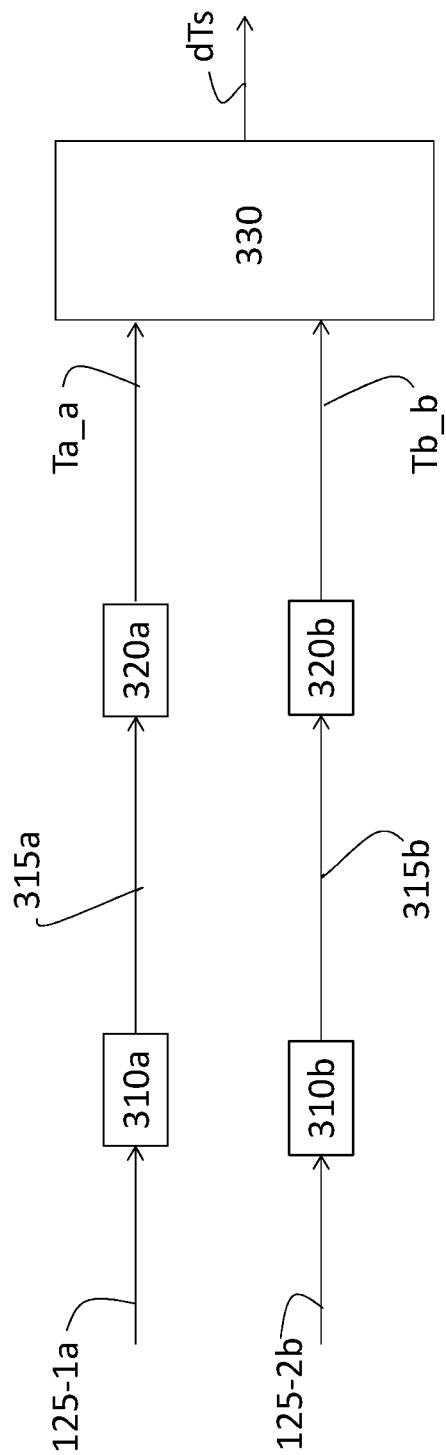
FIG. 3 is a block diagram of the processing used to synchronize two radars using range rather than clock synchronization according to one or more embodiments.

FIG. 3 is a block diagram of the processing used to synchronize two radars 110a, 110b using range rather than clock synchronization according to one or more embodiments. The reflection 125-1a that results from transmission of a chirp 105-1 by the radar 110a is received at radar 110a. At block 310a, FFT processing is performed to obtain range information in a frequency domain signal 315a. The use of a discrete Fourier transform (DFT) or FFT to obtain range information from radar reflections is well known and not further detailed here. At block 320a, the signal 315a is converted to the time domain and provides Ta_a. The processing of the reflection 125-1a is performed by the controller 119a in radar 110a, for example.

The reflection 125-2b that results from transmission of a chirp 105-2 by the radar 110b is received at radar 110b. At block 310b, an FFT is performed to obtain range information in a frequency domain signal 315b. At block 320b, a frequency to time conversion is performed on signal 315b to obtain Tb_b. The processing at blocks 310b and 320b is performed by the controller 119b in the radar 110b, for example. One of the controllers 119a, 119b or both or a different controller 119 that communicates with both radars 110a, 110b obtains Ta_a and Tb_b and performs a subtraction and division by 2 according to EQ. 3 at 330. The result of the processing at block 330 is dTs. Once dTs is obtained, the radar 110b transmission can be adjusted. Rather than transmitting at a given trigger time that matches the trigger time of the radar 110a, the transmission trigger of radar 110b can be moved back to precede the transmission trigger of radar 110a by dTs to ensure that actual transmission of both radars 110a, 110b is synchronized. In this way, the clocks of each of the radars 110a, 110b need not be adjusted. Instead, the range determination by each radar 110*a*, 110*b* is used to synchronize the radars 110*a*, 110*b*.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A method of synchronizing two radars, the method comprising:
    transmitting a linear frequency modulated first signal from a first radar among the two radars;
    receiving a first reflection at the first radar based on the first signal, wherein the first reflection is from a target;
    transmitting a linear frequency modulated second signal from a second radar among the two radars;
    receiving a second reflection at the second radar based on the second signal, wherein the second reflection is from the target;
    performing a fast Fourier transform (FFT) on the first reflection and on the second reflection to respectively obtain a first frequency-domain signal and a second frequency-domain signal;
    converting the first frequency-domain signal and the second frequency-domain signal to the time domain to respectively obtain a first time-domain signal and a second time-domain signal;
    processing the first time-domain signal and the second time-domain signal to obtain a time difference in transmission of the first signal and the second signal; and
    adjusting the two radars, based on the time difference, to synchronize subsequent transmissions by the two radars.

2. The method according to claim 1, wherein the first signal and the second signal have a same frequency slope.

3. The method according to claim 1, wherein the processing the first time-domain signal and the second time-domain signal includes subtracting the second time-domain signal from the first time-domain signal to obtain a subtraction result.

4. The method according to claim 3, wherein the processing the first time-domain signal and the second time-domain signal further includes dividing the subtraction result by two to obtain the time difference.

5. The method according to claim 1, wherein the adjusting the two radars includes triggering the second radar to transmit before triggering the first radar to transmit.

6. The method according to claim 5, wherein the adjusting the two radars includes modifying a transmission trigger of the second radar to trigger transmission earlier by a time equal to the time difference.

7. A system to synchronize two radars, the system comprising:
    a first radar among the two radars configured to transmit a linear frequency modulated first signal and receive a first reflection from a target based on the first signal;
    a second radar among the two radars configured to transmit a linear frequency modulated second signal and receive a second reflection from a target based on the second signal;
    a first controller configured to perform a fast Fourier transform (FFT) on the first reflection to obtain a first frequency-domain signal and convert the first frequency-domain signal to a first time-domain signal; and
    a second controller configured to perform an FFT on the second reflection to obtain a second frequency-domain signal and convert the second frequency-domain signal to a second time-domain signal, wherein the first controller or the second controller processes the first time-domain signal and the second time-domain signal to obtain a time difference and adjusts the two radars based on the time difference to synchronize subsequent transmissions by the two radars.

8. The system according to claim 7, wherein the first controller and the second controller are a same controller.

9. The system according to claim 7, wherein the first signal and the second signal have a same frequency slope.

10. The system according to claim 7, wherein the first controller or the second controller subtracts the second time-domain signal from the first time-domain signal to obtain a subtraction result.

11. The system according to claim 10, wherein the first controller or the second controller divides the subtraction result by two to obtain the time difference.

\* \* \* \* \*